United States Patent
Morelli

(10) Patent No.: US 9,308,963 B2
(45) Date of Patent: Apr. 12, 2016

(54) PEDAL FOR A BICYCLE

(71) Applicant: Angelo Morelli, Pontenure (IT)

(72) Inventor: Angelo Morelli, Pontenure (IT)

(*) Notice: Subject to any disclaimer, the term of this patent is extended or adjusted under 35 U.S.C. 154(b) by 143 days.

(21) Appl. No.: 14/018,094

(22) Filed: Sep. 4, 2013

(65) Prior Publication Data

US 2014/0060243 A1    Mar. 6, 2014

(30) Foreign Application Priority Data

Sep. 5, 2012  (IT) .............................. MI2012A1481

(51) Int. Cl.
*B62M 3/08*     (2006.01)
*B62M 3/00*     (2006.01)

(52) U.S. Cl.
CPC ................. *B62M 3/08* (2013.01); *B62M 3/003* (2013.01); *Y10T 74/2168* (2015.01)

(58) Field of Classification Search
CPC .. Y10T 74/2164; Y10T 74/2165; B62M 3/00; B62M 3/003; B62M 2003/006; B62M 1/36
USPC ........... 74/473.12, 473.14, 489, 501.6, 502.2; 200/61.88; 439/31; 192/217; 361/679.28; 280/259
See application file for complete search history.

(56) References Cited

U.S. PATENT DOCUMENTS

| | | | |
|---|---|---|---|
| 4,201,120 A * | 5/1980 | Segawa | 74/594.2 |
| 4,331,043 A * | 5/1982 | Shimano | 74/594.2 |
| 4,932,287 A | 6/1990 | Ramos | |
| 5,048,369 A | 9/1991 | Chen | |
| 5,199,324 A | 4/1993 | Sain | |
| 5,203,229 A | 4/1993 | Chen | |
| 5,377,561 A | 1/1995 | Danieli et al. | |
| 5,470,277 A * | 11/1995 | Romano | 474/70 |
| 6,076,427 A | 6/2000 | Nutto et al. | |
| 6,543,310 B1 | 4/2003 | Baker et al. | |
| 7,017,445 B2 | 3/2006 | Bryne | |
| 8,025,304 B2 * | 9/2011 | Smith | 280/259 |
| 2005/0155452 A1 | 7/2005 | Frey | |
| 2006/0162489 A1 | 7/2006 | Raad et al. | |
| 2007/0182122 A1 * | 8/2007 | Smith | 280/256 |
| 2014/0060245 A1 | 3/2014 | Morelli | |

FOREIGN PATENT DOCUMENTS

EP          0542238 A1    5/1993

(Continued)

OTHER PUBLICATIONS

Search Report dated May 10, 2013 from Italian application MI2012A001481, filed Sep. 5, 2013.

(Continued)

*Primary Examiner* — Thomas Diaz
(74) *Attorney, Agent, or Firm* — Vorys, Sater, Seymour and Pease LLP

(57) ABSTRACT

A bicycle pedal unit comprises a central body (2) associable with a tube of a bicycle frame; two pedal cranks (3, 4) connected to opposite ends (2a) of the central body (2); two pedals (5, 6), each connected to a respective pedal crank (3, 4); the angular position of at least a movable pedal crank (3) is adjustable relative to the other pedal crank (4), which is fixed.

12 Claims, 7 Drawing Sheets

(56) References Cited

FOREIGN PATENT DOCUMENTS

| | | |
|---|---|---|
| EP | 0774407 A1 | 5/1997 |
| FR | 383221 A | 2/1908 |
| FR | 2526392 A1 | 11/1983 |
| FR | 2594402 A1 | 8/1987 |
| FR | 2623464 A1 | 5/1989 |

OTHER PUBLICATIONS

Search Report dated May 10, 2013 from Italian application MI2012A001483, filed Sep. 5, 2013.

Non Final Office Action, mailed Jul. 8, 2015 for U.S. Appl. No. 14/018,181 to Morelli, filed Sep. 4, 2013.

* cited by examiner

PEDAL FOR A BICYCLE

FIELD OF THE INVENTION

The present invention relates to a bicycle pedal unit.

In particular, the present invention finds application in common men's and women's bicycles, in sports bicycles, in mountain bikes and in others.

BACKGROUND OF THE INVENTION

Pedal units for bicycles of the known art comprise a central movement associated with a tube of the bicycle frame and two pedal cranks fixed to opposite ends of the central movement.

The central movement substantially comprises a pin disposed horizontally perpendicular to the bicycle travel direction, and bearings positioned at the ends of the pin to enable the connection to the bicycle frame.

The pedal cranks are mounted on the central movement such as to lie in a single plane, at least with reference to a leading extending axis of the pedal cranks.

A pair of pedals are mounted on the pedal crank in opposite positions about the central movement.

Disadvantageously, the pedal stroke with this traditional configuration of the pedal cranks presents so-called dead points, i.e. angular positions of said pedal cranks in which the pedals are at a maximum and a minimum level. In these positions, the action of the user in the vertical direction on the pedals is substantially aligned with the pedal crank and the torque applied thereto is consequently zero. Hence to overcome the dead angle positions, the user has to apply a direct additional action perpendicular to the pedal crank.

This renders the pedal stroke uncomfortable and awkward.

SUMMARY OF THE INVENTION

In this contest, the technical aim at the base of the present invention is to propose a bicycle pedal unit which overcomes the drawbacks of the aforestated known art.

A particular object of the present invention is to provide a bicycle pedal unit able to ensure effective and comfortable travel.

Further characteristics and advantages of the present invention will be more apparent from the indicative and therefore non-limiting description of a preferred but non-exclusive embodiment of a bicycle pedal unit, as illustrated in the accompanying drawings, in which:

DETAILED DESCRIPTION OF THE PREFERRED EMBODIMENTS

Figure 1:
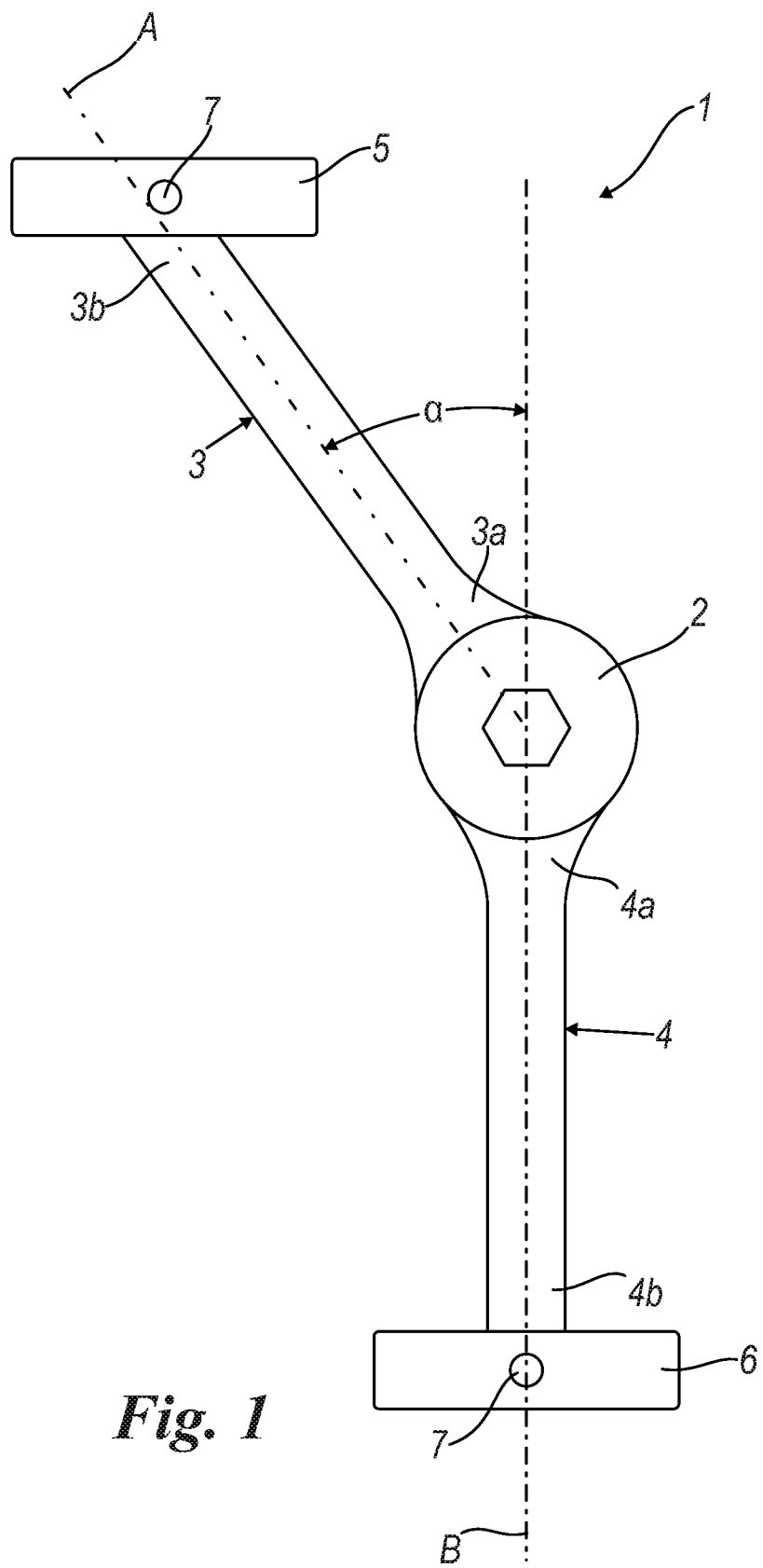
FIG. 1 is a schematic lateral view of a bicycle pedal unit in accordance with the present invention.
Figure 2:
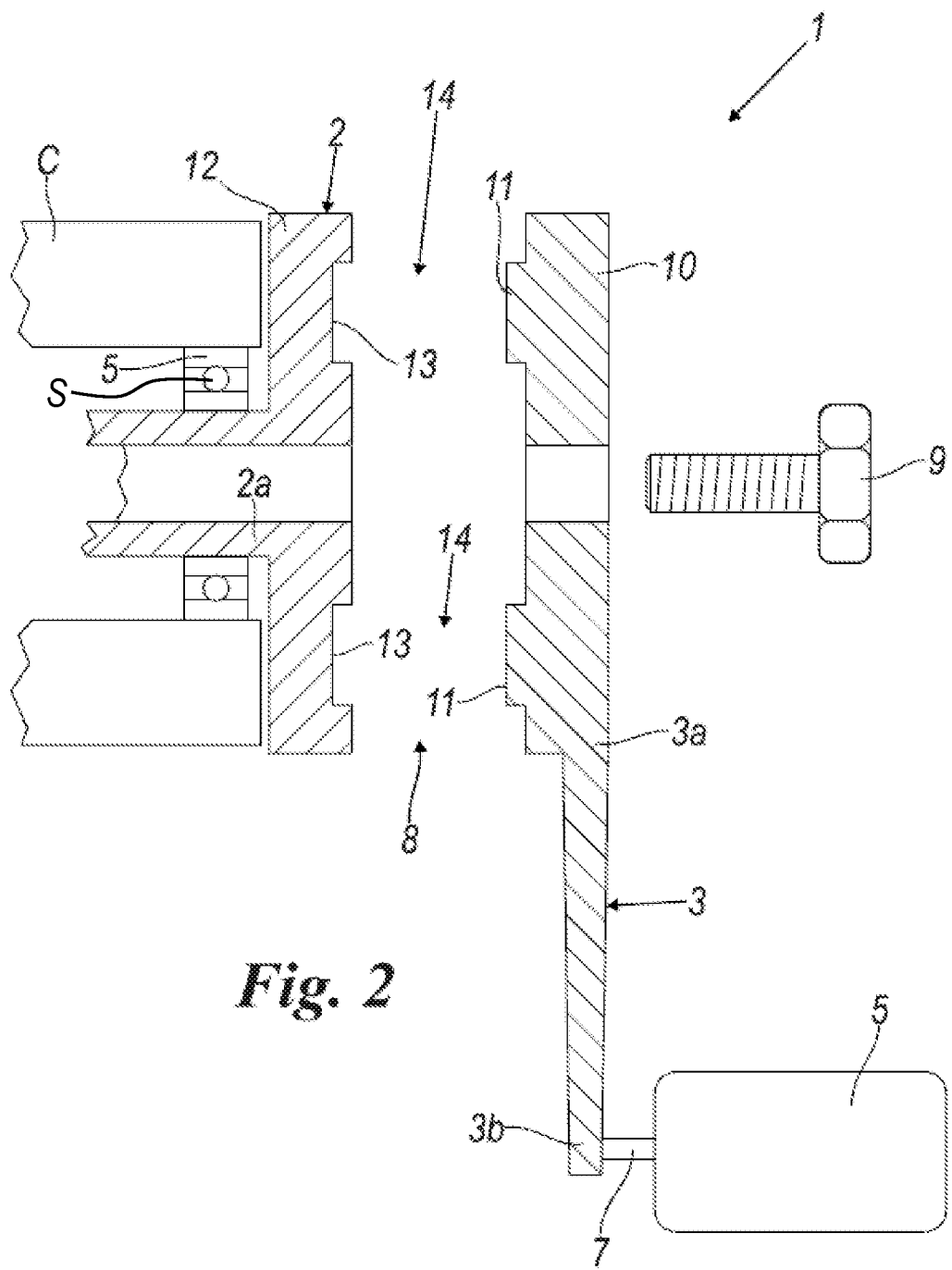
FIG. 2 is a lateral section through a detail of the pedal unit of FIG. 1.
Figure 3:
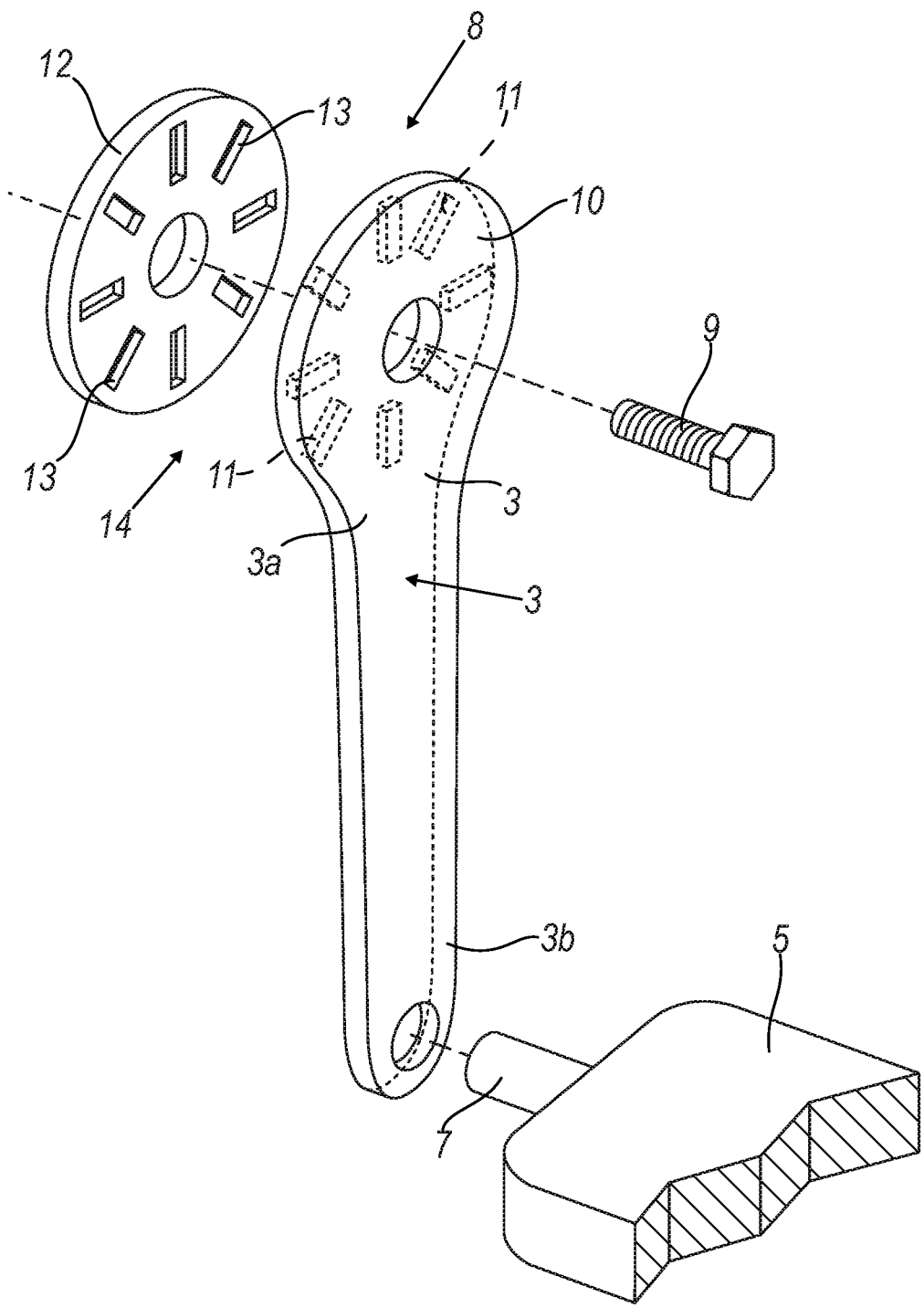
FIG. 3 is a perspective view of the detail of FIG. 2.
Figure 4:
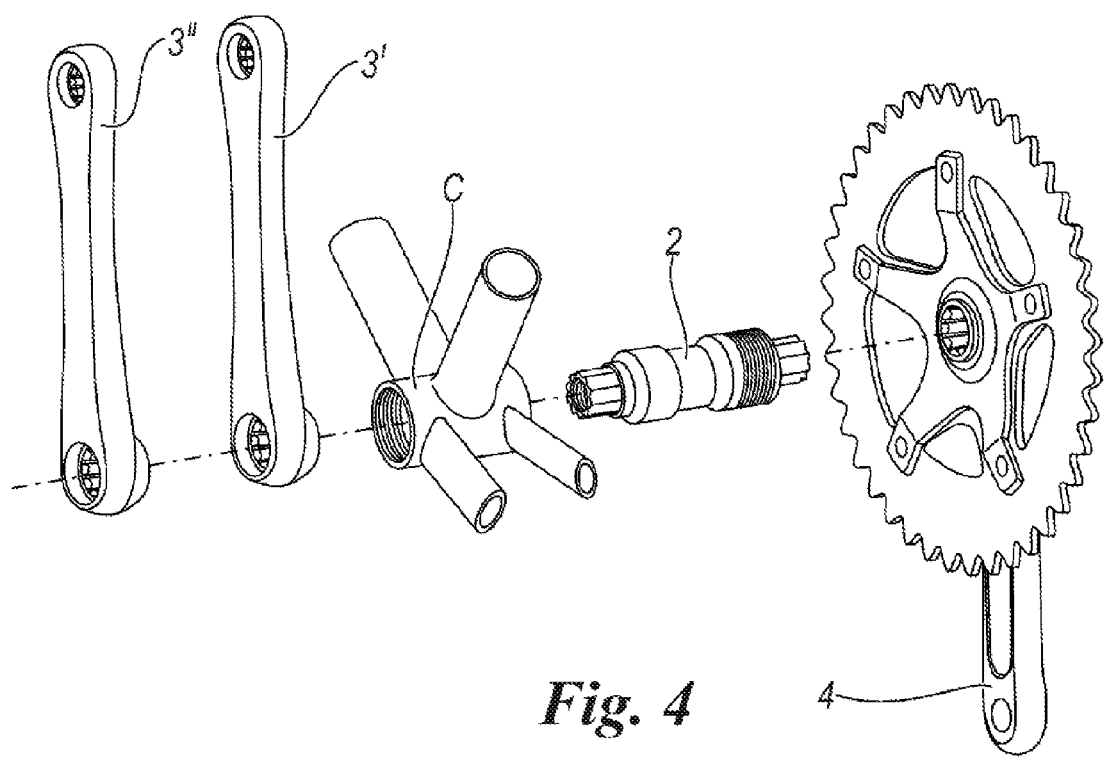
FIG. 4 is a perspective exploded view of the bicycle frame and of the kit of a further embodiment of the present invention to be fixed to the frame.
Figure 5:
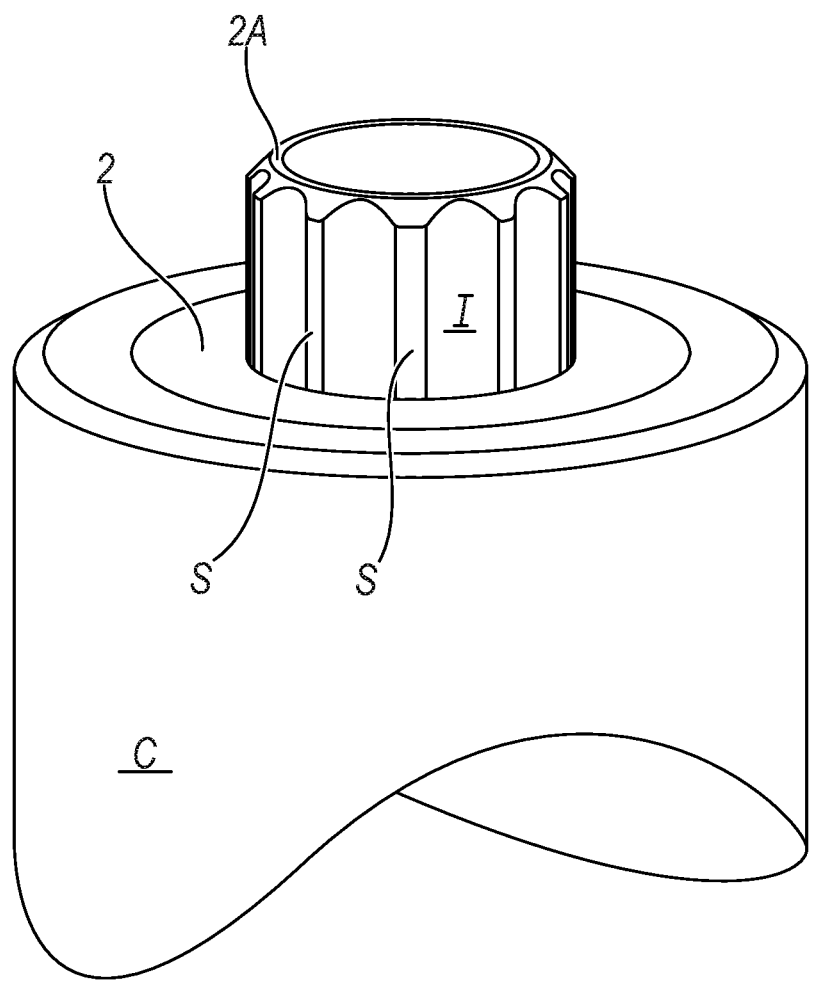
FIG. 5 is a detail view of a portion of the frame comprising the central body of the kit of the present invention.

With reference to the accompanying figures, the reference numeral 1 indicates overall a bicycle pedal unit in accordance with the present invention.

The pedal unit 1 comprises a central body 2 associable with a tube C of a bicycle frame. The central body 2 is also known colloquially as the "central movement". It is of substantially cylindrical shape and, by way of example, it is internally hollow. The central body 2 is mounted coaxially to the tube C and preferably ball or roller bearings S are positioned between is the tube C and the central body 2 at opposite ends 2a of the central body 2.

Two pedal cranks 3, 4 are connected to the central body 2. In detail, each pedal crank 3, 4 presents a first end 3a, 4a connected to the respective opposite ends of the central body 2.

Two pedals 5, 6 are mounted on the respective pedal cranks 3, 4. In greater detail, the pedals 5, 6 are connected to second ends 3b, 4b, oppositely the first ends 3a, 4a of the pedal cranks 3, 4 by respective pins 7.

Each pedal crank 3, 4 is of elongate form along respective leading extension axes A, B. Preferably, each pedal crank 3, 4 is of substantially rectilinear extension.

According to the present invention, the angular position of at least one movable pedal crank 3 is adjustable relative to the other fixed pedal crank 4.

In other words, the pedal cranks 3, 4 define between them an angle α with reference to a lateral view (FIG. 1). In greater detail, this angle α can be defined as the angle subtended by the leading extension axes A, B when projected onto a central plane of the bicycle. It should be noted that in accordance to that illustrated, the angle α is the angle subtended by the fixed pedal crank 4 and the prolongation of the movable other pedal crank 3 towards the fixed pedal crank 4.

The angular position of a pedal crank 3 can however be modified such as to change the angle α.

Alternatively, both the pedal cranks 3, 4 are movable with respect to the other and with respect to the central body 2.

Advantageously, the angle α can vary between 0.01° and 15°, preferably between 1° and 5°.

In this respect, the pedal unit 1 also comprises an adjustment member 8 positioned between the central body 2 and at least one pedal crank 3, 4. In detail, the adjustment member 8 is positioned between the movable pedal crank 3 and the central body 2.

In the illustrated embodiment, the adjustment member 8 can be switched between a fixed configuration in which the movable pedal crank 3 is rigidly associated with the central body 2 and a movable configuration in which the movable pedal crank 3 is rotatably associated with the central body 2.

In this respect, at least the movable pedal crank 3 is fixed to the central body 2 by a screw or bolt 9. Alternatively, at least the movable pedal crank 3 is fixed to the central body 2 by any reversible fixing means.

The movable pedal crank 3 comprises a first element 10 positioned at its first end 3a. This first element 10 comprises a plurality of projections 11 (or alternatively of recesses). Preferably, these projections 11 are disposed on a circumferential arc and are angularly equidistant.

The angular distance between the projections 11, and that between the recesses 13, defines the minimum step through which the angle α can be adjusted.

Likewise, the central body 2 presents a second element 12 positioned at the end 2a adjacent to the movable pedal crank 3. This second element 12 presents a plurality of recesses 13 (or alternatively of projections) facing the projections 11 of the first element 10.

In the fixed configuration, the projections 11 of the first element 10 are inserted securely into the recesses 13 of the second element 12.

In this context, the first element 10 with the projections 11 and the second element 12 with the recesses 13 define antirotational means 14 positioned between the movable pedal crank 3 and the central body 2 and active within the fixed configuration.

Alternatively, similar antirotational means can be positioned between the pedal crank 4—this also being movable in this embodiment—and the central body 2 and active in the fixed configuration.

In a further embodiment illustrated in FIGS. 4, 5, 6 and 6A, the movable pedal crank 3 presents a coupling hole 20 in which the end 2a of the central body 2 is coaxially housed. In the embodiment illustrated in detail in FIG. 6, the pedal crank 3' presents a body 23 formed of carbon fibre in which a seat 21 (in fact a hole) is provided arranged to house a sleeve 22 is of preferably metal material. The body and the sleeve are torsionally restrained for example by suitable adhesive or other suitable means.

Said antirotational means are hence provided between an inner surface of the sleeve and the end 2a of the central body 2.

In this embodiment, the antirotational means comprise projections S (and/or recesses I) associated with the inner surface of the coupling hole (in this case in the sleeve 22) which engage in respective recesses I (and/or projections) provided on the end 2a of the central body 2. In fact the antirotational means are defined by a grooved profile.

In this case the adjustment member 8 comprises a kit containing a plurality of movable pedal cranks 3', 3" interchangeable on the central body.

The movable pedal cranks 3', 3" are coupled to the central body by the aforedescribed male-female coupling (grooved profile). In greater detail, a male (or female) portion can be associated with the central body 2 and a plurality of female (or male) portions can be associated with the respective pedal cranks of the kit. Advantageously, each mobile pedal crank of the kit presents a distinct inclination $\alpha_1$, $\alpha_2$ to the corresponding male portion of the coupling.

If the inclination needs to be adjusted, the correct pedal crank 3', 3" must be identified on the basis of the required inclination, then mounted on the central body 2.

The use of the sleeve 22 make it particularly simple and economical to series construct movable pedal cranks which form the kit. In fact several identical bodies 23 provided with the seat 21 can be provided. Several sleeves 22 also totally identical are then provided.

During assembly the sleeve 22 is fixed into the seat 21 (for example by suitable adhesive or other fixing means) with the sleeve 22 sufficiently rotated relative to the seat through the desired angle, to achieve the correct final inclination of the pedal crank when mounted on the central body 2. The procedure is repeated until the number of pedal cranks necessary for the kit is obtained.

In particular the kit of the present invention can comprise at least two is interchangeable or movable pedal cranks 3', 3", each having a different inclination to the fixed pedal crank when mounted on the central body.

Figure 6:
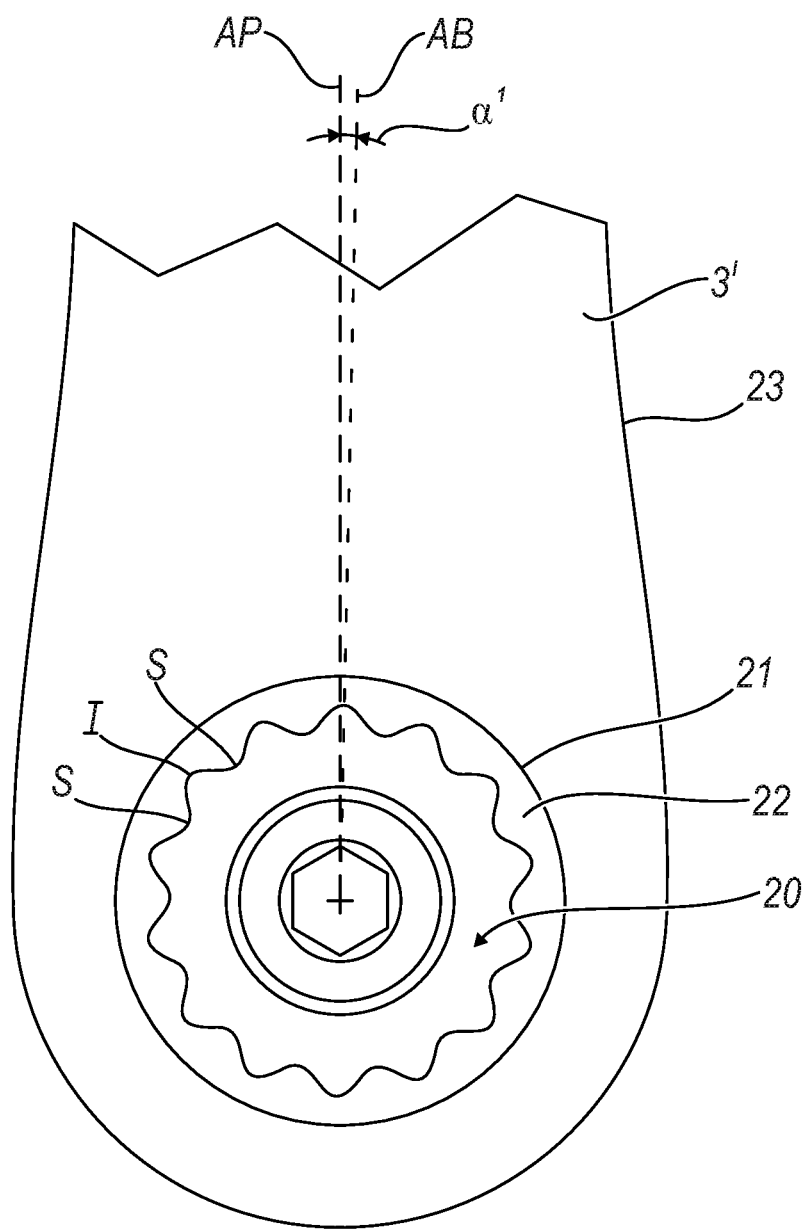
FIG. 6 is a front view of a portion of one of interchangeable pedal crank of the present invention.
Figure 6A:
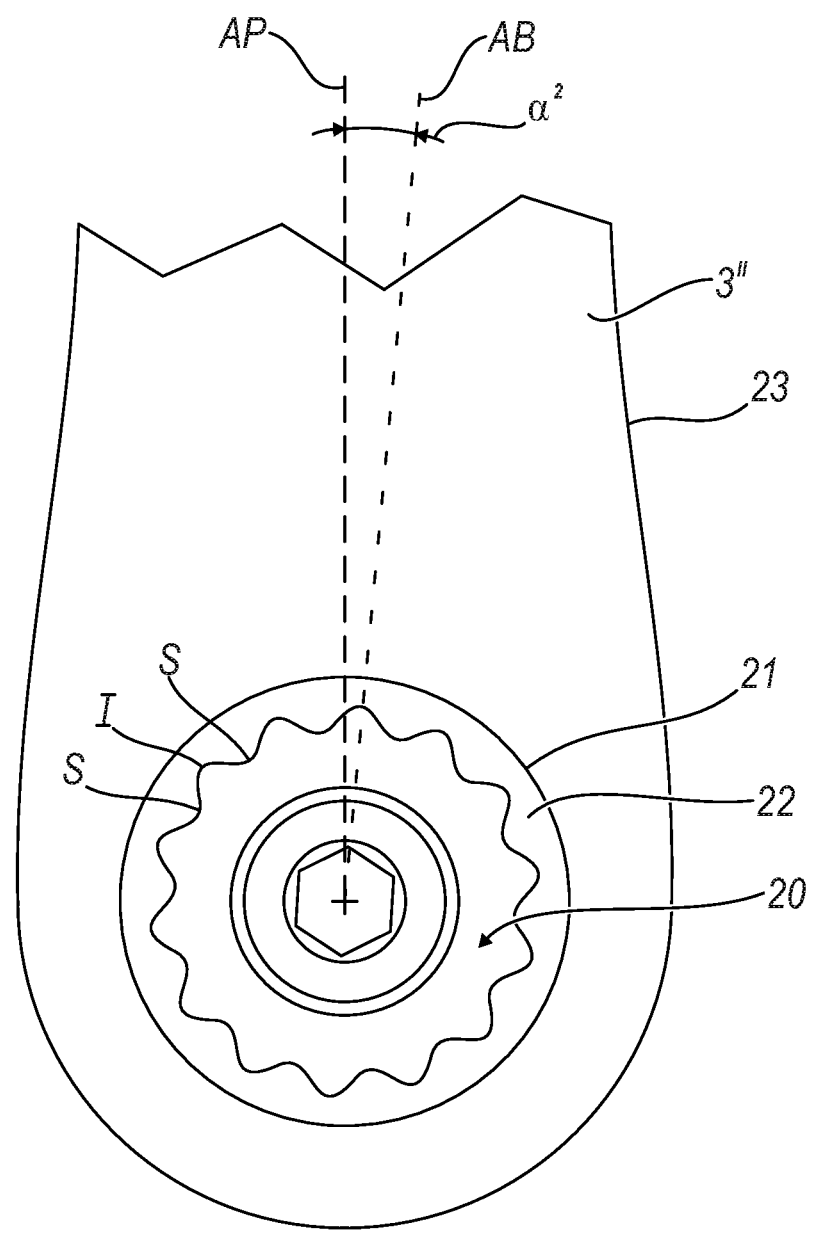
FIG. 6A is a front view of a portion of another interchangeable pedal crank of the invention.

In comparing FIGS. 6 and 6A it can be seen that on the first pedal crank 3' (FIG. 6) the axis of the pedal crank AP forms with the axis of the sleeve AB an angle $\alpha_1$ which is less than the angle $\alpha_2$ formed by the axis of the pedal crank and by the axis of the sleeve of the second pedal crank 3" (FIG. 6A). The steps through which these angles can be varied are identical to those already described.

Advantageously the kit can also comprise a movable pedal crank which when mounted on the central body is aligned with the fixed pedal crank ($\alpha$=0), to hence form a totally traditional central movement (for example with the sleeve axis coinciding with that of the pedal crank).

The invention as described achieves the proposed object.

In this respect, by being able to adjust the mutual inclination of the pedal cranks, a configuration can be achieved in which, when a pedal crank reaches the dead angle position, the other pedal crank is leading or lagging and will already have passed beyond (or still has to pass) the corresponding dead point position. Hence no additional action will be required by the user to overcome these positions.

It should be noted that in the aforegoing, carbon pedal cranks have been described which require, for their fixing to the central body, the use of a sleeve. Evidently in the case of pedal cranks constructed of metal or other traditional materials, the grooved profile can be provided directly in a hole provided in the body of the pedal crank.

The invention claimed is:

1. A pedal unit kit for bicycles comprising:
a central body associable with a tube of a bicycle frame, the central body having first and second opposed end;
a fixed pedal crank connected to the first opposed end of the central body;
a first interchangeable pedal crank and at least one second interchangeable pedal crank for adjusting the angular position of the fixed pedal crank relative to the interchangeable pedal crank,
each of the interchangeable pedal cranks being provided with means for its torsional coupling to the second opposed end of the central body, able to achieve a different inclination of an axis of the first interchangeable pedal crank and of the second interchangeable pedal crank to an axis of the fixed pedal crank,
wherein the means for torsional coupling includes antirotation means comprising male and female portions associated with the interchangeable pedal cranks and/or associated with the central body;
wherein at least one said interchangeable pedal crank is configured for adjusting angular position of the fixed pedal crank relative to this interchangeable pedal crank to have the pedal on this interchangeable pedal crank leading or lagging relative to the axis of the fixed pedal crank, with this interchangeable pedal crank and the fixed pedal crank not in the same plane;
wherein each interchangeable pedal crank has a body which defines a seat, which is a hole, provided to house a grooved sleeve having grooves, wherein the body is attached to the sleeve, the antirotational means comprise an inner surface of the sleeve and the second end of the central body;
wherein each interchangeable pedal crank presents a distinct inclination $\alpha 1$, $\alpha 2$ to a corresponding male portion of a coupling,
first interchangeable pedal crank has angle $\alpha 1$ formed by the longitudinal axis of the first interchangeable crank and a line from the center of its seat, which is a corresponding male portion of the torsional coupling to the second opposed end of the central body, through the middle of a groove of its grooved sleeve through which the longitudinal axis of the first interchangeable crank also passes, second interchangeable pedal crank has angle α2 formed by the longitudinal axis of the second interchangeable crank and a line from the center of its seat, which is a corresponding male portion of the torsional coupling to the second opposed end of the central body, through the middle of a groove of its grooved sleeve through which the longitudinal axis of the second interchangeable crank also passes, wherein α1 does not equal α2.

2. A kit as claimed in claim 1, wherein each interchangeable pedal crank forms a respective angle between the axis of the fixed pedal crank and the axis of the respective interchangeable pedal crank which lies between 0 and 15°.

3. A kit as claimed in claim 1, wherein the antirotational means comprise projections and/or recesses associated with the interchangeable pedal crank, and respective recesses and/or projections associated with the central body.

4. A kit as claimed in claim 1, wherein the antirotational means comprise a grooved profile.

5. A kit as claimed in claim 3, wherein the projections and/or recesses or a grooved profile of at least one of the interchangeable pedal cranks are provided in a sleeve fixed to the body of the pedal crank.

6. A kit as claimed in claim 2, wherein the antirotational means comprise projections and/or recesses associated with the interchangeable pedal crank, and respective recesses and/or projections associated with the central body.

7. A kit as claimed in claim 2, wherein the antirotational means comprise a grooved profile.

8. A kit as claimed in claim 4, wherein projections and/or recesses or the grooved profile of at least one of the interchangeable pedal cranks are provided in a sleeve fixed to the body of the pedal crank.

9. A kit as claimed in claim 1, wherein each respective angle between the axis of the fixed pedal crank and the axis of the respective interchangeable pedal crank lies between 1° and 5°.

10. A kit as claimed in claim 1, wherein the body is attached to the sleeve.

11. A pedal unit kit for bicycles comprising:
a central body associable with a tube of a bicycle frame, the central body having first and second opposed end;
a fixed pedal crank connected to the first opposed end of the central body;
a first interchangeable pedal crank and at least one second interchangeable pedal crank for adjusting the angular position of the fixed pedal crank relative to the interchangeable pedal crank,
each of the interchangeable pedal cranks being provided with means for its torsional coupling to the second opposed end of the central body, able to achieve a different inclination of an axis of the first interchangeable pedal crank and of the second interchangeable pedal crank to an axis of the fixed pedal crank,
wherein the means for torsional coupling includes antirotation means comprising male and female portions associated with the interchangeable pedal cranks and/or associated with the central body;
wherein at least one said interchangeable pedal crank is configured for adjusting angular position of the fixed pedal crank relative to this interchangeable pedal crank to have the pedal on this interchangeable pedal crank leading or lagging relative to the axis of the fixed pedal crank, with this interchangeable pedal crank and the fixed pedal crank not in the same plane;
wherein each interchangeable pedal crank has a body which defines a seat housing a sleeve having grooves, the antirotational means comprise an inner surface of the sleeve and the second end of the central body,
wherein the longitudinal axis of each interchangeable pedal crank passes from the longitudinal axis of the central body through a respective said groove when said respective interchangeable pedal crank and central body are attached;
wherein the longitudinal axis of the first interchangeable pedal crank and a line from a center of its sleeve to a center of the respective said groove of its grooved sleeve through which the longitudinal axis of the first interchangeable crank also passes, is offset at a different angle than the longitudinal axis of the second interchangeable pedal crank and line from a center of its sleeve to a center of the respective said groove of its grooved sleeve through which the longitudinal axis of the second interchangeable crank also passes.

12. A kit as claimed in claim 11, wherein the body is attached to the sleeve.

* * * * *